(12) United States Patent
Nishida (10) Patent No.: US 8,292,036 B2
(45) Date of Patent: Oct. 23, 2012

(54) OIL SUCTION SYSTEM

(75) Inventor: Naofumi Nishida, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 605 days.

(21) Appl. No.: 12/254,128

(22) Filed: Oct. 20, 2008

(65) Prior Publication Data

US 2009/0101441 A1   Apr. 23, 2009

(30) Foreign Application Priority Data

Oct. 23, 2007   (JP) ................................. 2007-275358

(51) Int. Cl.
*F01M 11/06*   (2006.01)
(52) U.S. Cl. ........................................ 184/6.2; 184/6.24
(58) Field of Classification Search .................. 184/106, 184/6.2; 123/196
See application file for complete search history.

(56) References Cited

U.S. PATENT DOCUMENTS

| | | | | |
|---|---|---|---|---|
| 4,938,184 | A * | 7/1990 | Martin et al. ............. | 123/195 C |
| 4,995,971 | A * | 2/1991 | Droste et al. ............. | 210/167.03 |
| 5,653,205 | A * | 8/1997 | Ozeki ......................... | 123/195 C |
| 5,975,041 | A * | 11/1999 | Narita et al. ............... | 123/196 R |
| 6,041,751 | A * | 3/2000 | Kuriyama et al. ......... | 123/195 C |
| 6,340,012 | B1 * | 1/2002 | Yamashita et al. ........ | 123/195 C |
| 6,845,743 | B1 * | 1/2005 | Bishop ....................... | 123/195 C |
| 2003/0029412 | A1 * | 2/2003 | Kato et al. ................. | 123/195 C |

FOREIGN PATENT DOCUMENTS

| | | |
|---|---|---|
| JP | 5881305 U | 6/1983 |
| JP | 62-288774 A | 12/1987 |
| JP | 04-084960 U | 7/1992 |
| JP | 05-280619 A * | 10/1993 |
| JP | 5-90020 U | 12/1993 |
| JP | 07-8922 Y2 | 3/1995 |
| JP | 08-018496 B2 | 2/1996 |

(Continued)

OTHER PUBLICATIONS

European Search Report dated Nov. 30, 2011.
Japanese Patent Office Action dated Sep. 14, 2010 for JP 2007-275358 and partial English-language translation thereof.

(Continued)

*Primary Examiner* — Michael Mansen
*Assistant Examiner* — Michael Riegelman
(74) *Attorney, Agent, or Firm* — Sughrue Mion, PLLC (57) ABSTRACT

In an oil suction system for drawing up oil stored in an oil reservoir through a strainer, the oil reservoir is constructed such that, when the liquid surface of the oil is inclined due to movement of the stored oil, the level of the liquid surface close to the suction port varies in accordance with a plurality of directions of inclination of the liquid surface, and the level of the liquid surface close to the suction port is lower in a particular direction as one of the directions of inclination of the liquid surface than those in the other directions of inclination, and an inflow resistance portion is provided at a lowered liquid-level side of the suction port on which the liquid level is lowered when the oil surface is inclined in the particular direction, for increasing the resistance to flow of the oil from the lowered liquid-level side toward the suction port, to be larger than the resistance to flow of the oil from a raised liquid-level side of the suction port on which the liquid level is raised due to inclination in the particular direction, toward the suction port.

7 Claims, 7 Drawing Sheets

FOREIGN PATENT DOCUMENTS

| | | | |
|---|---|---|---|
| JP | 10-121933 A | | 5/1998 |
| JP | 2002-180814 A | | 6/2002 |
| JP | 2002180814 A | * | 6/2002 |
| JP | 2005120879 A | * | 5/2005 |
| JP | 2007-56677 A | | 3/2007 |

OTHER PUBLICATIONS

Japanese Patent Office Action dated May 10, 2011 for JP 2007-275358 and partial English-language translation thereof.

* cited by examiner

OIL SUCTION SYSTEM

INCORPORATION BY REFERENCE

The disclosure of Japanese Patent Application No. 2007-275358 filed on Oct. 23, 2007 including the specification, drawings and abstract is incorporated herein by reference in its entirety.

BACKGROUND OF THE INVENTION

1. Field of the Invention

The invention relates to an oil suction system, and in particular to an oil suction system provided in a lower part of an automatic transmission of a vehicle.

2. Description of the Related Art

In a vehicle, such as an automobile, including a power transmitting system, such as an automatic transmission, incorporating a hydraulic circuit, al oil suction system is installed which includes an oil pan mounted on the bottom of the power transmitting system, in order to improve the capability of collecting oil to be supplied to and discharged from the hydraulic circuit. In the oil suction system, the oil pan is often required to have a shallow depth so as to ensure a sufficient ground clearance of the vehicle, while it is necessary to prevent air from being drawn up even if the liquid level of the oil near a suction port is lowered.

For example, Japanese Patent Application Publication No. 10-121933 (JP-A-10-121933) discloses an oil suction system for use in the engine, in which a pair of partition walls that are opposed to each other are provided in the vicinity of the interface of two casings, so as to form an oil suction space having two oil chambers with different amounts of oil stored therein, and a suction port is slightly inclined at the inlet of the oil suction space so that the larger amount of oil is drawn from one of the above-indicated oil chambers in which the larger amount of oil is stored.

Also, Japanese Utility Model Application Publication No. 5-90020 (JP-U-5-90020) discloses an oil suction system of an automatic transmission in which an oil pan having a reduced depth is often used, a strainer is supported onto a valve body at a position remote from a suction port such that the strainer is rotatable about the position (support) in a horizontal plane, and a weight is mounted at the suction-port side of the strainer, so that the suction port moves in a direction in which the oil in a reservoir moves during acceleration, deceleration, turning or braking of the vehicle, thereby to prevent drawing of air into the strainer.

Also, Japanese Patent Application Publication No. 2007-56677 (JP-A-2007-56677) discloses an oil suction system of an engine, in which a strainer is located close to the inner surface of the bottom of an oil pan and extends in the longitudinal direction, and an opening (suction port) formed in a rear end portion of the strainer is inclined such that the distance between the opening and the inner bottom surface of the oil pan increases from the front end to the rear end of the opening. This arrangement is developed in view of the situation where the oil moves to the rear side of the oil pan during uphill running or upon rapid acceleration, mid the liquid level is lowered at the front side and is raised at the rear side.

In the oil suction systems as described above, however, the oil chambers are formed by providing the mutually opposed partition walls at the interface of the cases, or the suction port is made movable in the direction of movement (shift) of the oil, thus making the construction of the system complicated and increasing the cost of manufacture of the system.

In the system in which the rear end portion of the strainer extends along the inner bottom surface of the oil pan, the suction port is located in a longitudinally middle portion of the oil pan, and the rear end portion of the strainer needs to be supported onto the oil pan, which makes the construction of the system complicated. Furthermore, the oil suction system thus constructed cannot be expected to provide a sufficient effect of preventing drawing of air if it is employed as an oil suction system of an automatic transmission in which the depth of the oil pan is further reduced, and the strainer assumes a flattened shape extending in a horizontal plane.

Namely, in recent automatic transmissions, the amount of oil stored in the transmission needs to be reduced for an improvement in the efficiency particularly at high oil temperatures and for reduction in weight. If the amount of the oil stored is reduced, however, a low-oil-level portion (in which the amount of oil drawl into the strainer is larger than the amount of oil supplied to this portion) appears in the oil pan when the transmission is inclined at a low temperature (e.g., at about 0° C.), and drawing (suck-up) of air is likely to occur at the low-oil-level portion. If the oil storage capacity in each direction of the case differs when the transmission is inclined frontward, rearward, leftward and rightward, the level of the liquid surface (the liquid level) close to the suction port of the strainer upon inclination varies greatly even with the same oil amount. Furthermore, the oil supplied to the oil pan does not evenly or uniformly flow into the suction port, because of the layout of the interior of the oil pan, and a portion having a small amount of oil appears in the oil pan. For these reasons, and others, drawing (suck-up) of air into the oil pump occurs even where the suction port that is located in the central portion of the oil pan and is open backward while being inclined is provide at the rear end of the strainer that extends in the longitudinal direction. As a result, abnormal or unusual sound due to entry of air into gears may occur in an oil pump constituted solely by a gear pump, or poor pressure regulation may occur due to entry of air into a valve body.

SUMMARY OF THE INVENTION

The present invention provides an oil suction system that is simple in construction and prevents drawing of air.

One aspect of the invention relates to an oil suction system. The oil suction system includes an oil reservoir including an oil pan in which oil to be supplied to and discharged from a hydraulic circuit installed on a vehicle is stored, and a strainer having a suction port that faces to an inner bottom surface of the oil pan. In this system, the oil reservoir is constructed such that, when a liquid surface of the oil is inclined due to movement of the oil stored in the oil reservoir, the level of the liquid surface close to the suction port varies in accordance with a plurality of directions of inclination of the liquid surface, and the level of the liquid surface close to the suction port is lower in a particular direction as one of the above-indicated plurality of directions of inclination of the liquid surface, than those in the other directions of inclination, and an inflow resistance portion is provided at a lowered liquid-level side of the suction port on which the level of the liquid surface is lowered when the liquid surface is inclined in the particular direction, for increasing the resistance to flow of the oil from the lowered liquid-level side toward the suction port, to be larger than the resistance to flow of the oil from a raised liquid-level side of the suction port on which the Level of the liquid surface is raised due to inclination of the liquid surface in the particular direction, toward the suction port.

With the above-described arrangement, even if the liquid surface of the oil is inclined in the particular direction in which the liquid level is most likely to be lowered, the inflow resistance is increased on the lowered liquid-level side of the suction port on which the liquid level is lowered, while the inflow resistance is reduced on the raised liquid-level side of the suction port on which the liquid level is raised, whereby air is less likely or unlikely to be dram into the strainer.

According to the present invention, when the liquid surface of the oil is inclined in the particular direction in which the liquid level is most likely to be lowered, the inflow resistance on the lowered liquid-level side of the suction port on which the liquid level is lowered is increased, and the inflow resistance on the raised liquid-level side of the suction port on which the liquid level is raised is reduced. It is thus possible to provide an oil suction system which is simple in construction and is able to prevent drawing of air with reliability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First through sixth embodiments of the invention will be described in detail with reference to the drawings.

Figure 1:
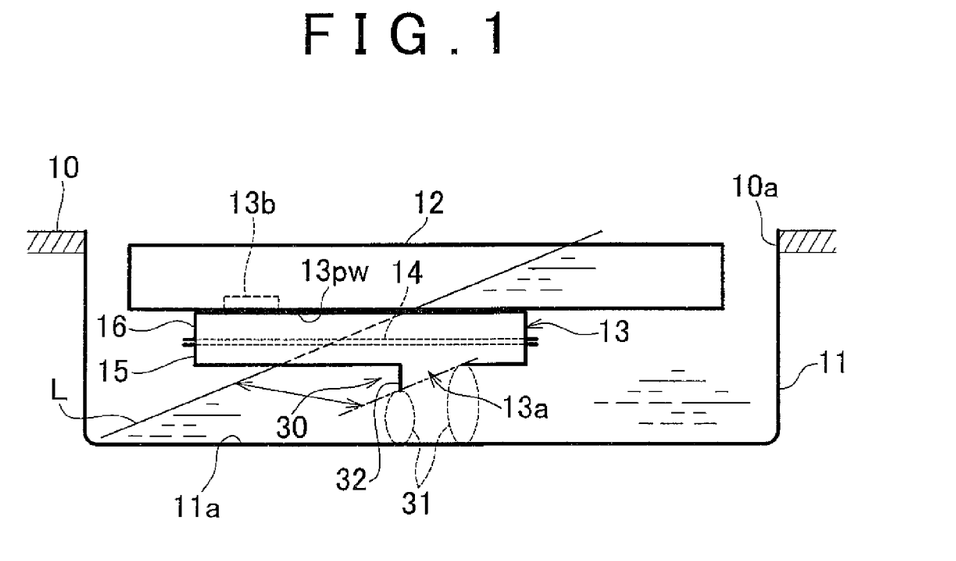
FIG. 1 is a view schematically showing the construction of an oil suction system according to a first embodiment of the invention.
Figure 2:
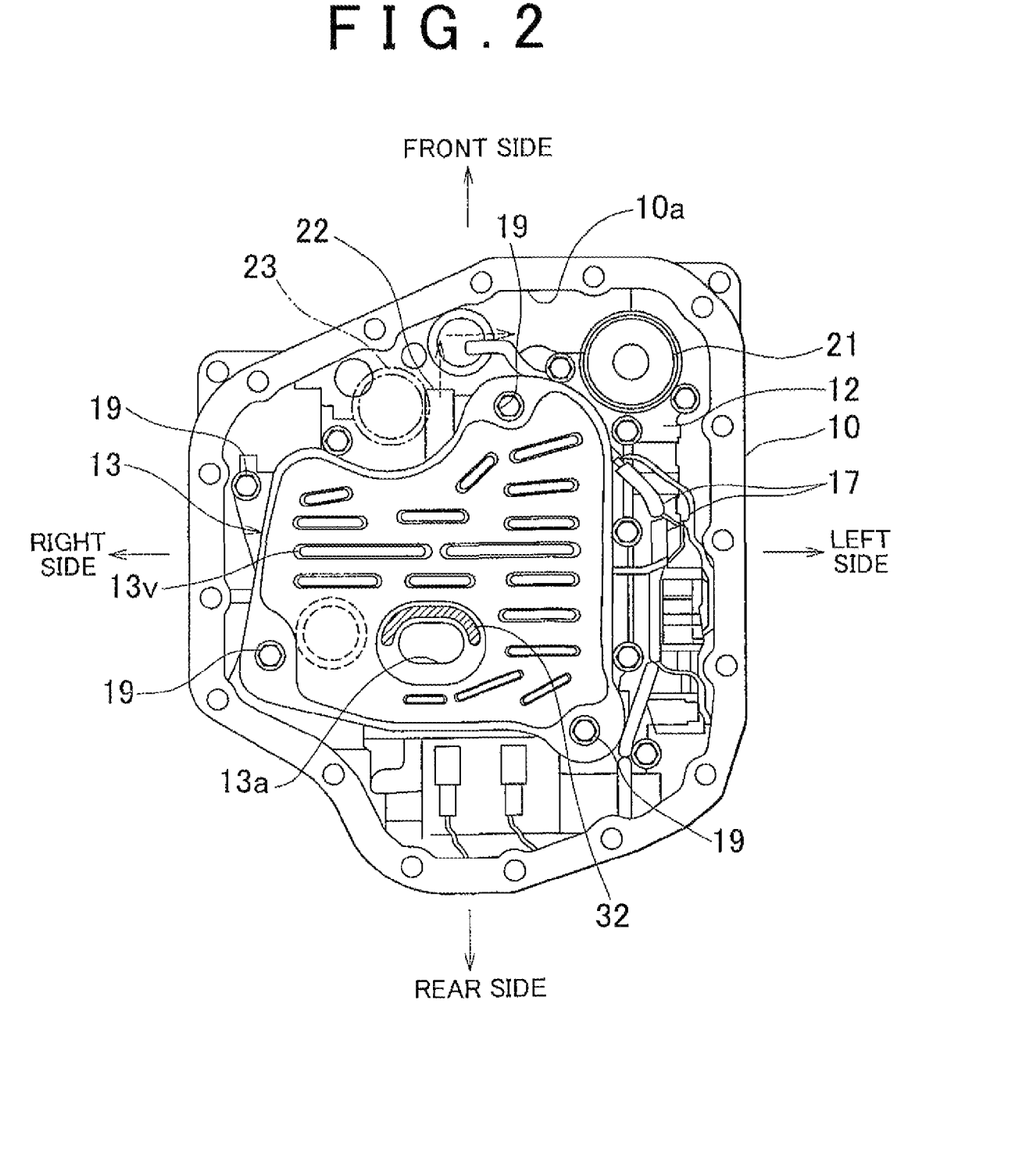
FIG. 2 is a bottom view showing a principal part of the oil suction system of the first embodiment of the invention, in a condition in which an oil pan of an automatic transmission in which the oil suction system is installed is removed.

FIG. 1 is a view schematically showing the construction of an oil suction system according to a first embodiment of the invention. FIG. 2 is a bottom view of a principal part of the oil suction system in a condition in which an oil pan of an automatic transmission (power transmitting system) on which the oil suction system is installed is removed from the system.

Initially, the construction of the oil suction system according to the first embodiment of the invention will be described.

As shown in FIG. 1 and FIG. 2, the oil suction system of this embodiment is mounted on the lower-face side of a case 10 of the automatic transmission (which will be called "transmission case 10"), and the transmission case 10 is formed with an opening 10a that receives an oil pan 11. A valve body 12 is provided in an upper part of the oil pan 11 to extend over substantially the entire area of the opening 10a, and a strainer 13 is provided under the valve body 12.

An oil pump in the form of a gear pump (e.g., a gear pump having a trochoid tooth profile) that is not illustrated is provided in the transmission case 10. In operation, the oil is drawn up by the oil pump through a strainer 13 while being filtered by the strainer 13, and is then supplied to various elements in the valve body 12 and various hydraulically operating parts and lubrication parts in the transmission case 10. Then, return oil that returns from these elements and parts drops into the oil pan 11.

The valve body 12, which is not illustrated in detail, includes hydraulic actuators for engaging and disengaging various friction coupling elements for shifting, which are disposed in the transmission case 10, supply/discharge control valves for supplying and discharging the oil serving as working fluid to and from the hydraulic actuators, pressure regulating valves for regulating the hydraulic pressures and accumulators (pressure accumulating elements), solenoid valves for switching various valves, and so forth. The valve body 12 constitutes a part of a hydraulic circuit provided in the transmission case 10. Through the various control elements housed in the valve body 12, the line pressure based on which engaging pressures of the individual friction coupling elements in the transmission case 10 are regulated is generated from an output port of a regulator valve, and the throttle pressure is regulated by throttle pressure regulating means including a linear solenoid valve(s) into a hydraulic pressure corresponding to the engine output torque, while the converter pressure and lubricating oil pressure suitable for the vehicle speed and the engine output or power is regulated on the basis of the throttle pressure. Also, in accordance with the position to which a manual valve is switched in response to a range selecting operation by the driver, a reverse range pressure is supplied from the manual valve when the reverse-drive range is selected, and, when a forward-drive range (for example, D, 2, 1) is selected, hydraulic pressures are supplied and discharged via appropriate shift valve(s) and accumulator(s) so as to actuate the friction coupling element(s) corresponding to the selected gear position or range. Also, the oil supplied to respective parts of the transmission is fed from the valve body 12 to an oil cooler where the oil is cooled, and excess oil returns to the oil pan via a cooler bypass valve. It is to be noted that the arrangement of the valve body 12 as described above is similar to that of a known counterpart, and is not limited to any particular circuit arrangement.

The strainer 13 includes a strainer member 14 serving as a filter for filtering oil, and lower case 15 and upper case 16 that are opposed to each other in the vertical direction with the strainer member 14 sandwiched therebetween. The strainer member 14 and the lower and upper cases 15, 16 cooperate to form a suction passage 13$pw$ that communicates with the interior of the valve body 12, and a generally oval suction port 13$a$ is formed in the bottom of the lower case 15 such that the suction port 13$a$ faces an inner bottom surface 11$a$ of the oil pan 11. Also, a connection port 13$b$ that is connected to an oil passage that leads to the oil pump is formed in the upper case 16, and the oil that has passed through and has been filtered by the strainer member 14 is drawn up into the oil pump through the connection port 13*b*. As shown in FIG. 2, the strainer 13 is fastened to the valve body 12 with a plurality of bolts 19, to be supported by the valve body 12.

On the other hand, when the return oil is circulated from the respective elements in the valve body 12 and the hydraulically operating parts and lubrication parts in the transmission case 10, toward the oil pan 11, the return oil drops into the oil pan 11 through a plurality of drain holes formed in the valve body 12 and the opening 10*a* (a clearance around the valve body 12) of the transmission case 10.

For example, part of the oil supplied to the oil cooler drops into an upper right-hand portion (in FIG. 2) of the oil pan 11 (e.g., a portion close to the left, front side of the transmission) through a pressure side strainer 21 as shown in FIG. 2. Also, the oil that has bypassed the oil cooler, for example, is drained toward the front side of the transmission, from a cooler bypass port 22 that protrudes from the valve body 12, upwardly of the strainer 13, and is open to the upper side as viewed in FIG. 2 (e.g., the front side of the transmission). Another return oil drops toward the lower side as viewed in FIG. 2 (e.g., the rear side of the transmission) in the oil pan 11 through a port or drain hole (not shown). An overflow tube 23 is provided in the vicinity of the cooler bypass port 22, for allowing excess oil to be discharged outside when an excessive amount of oil is introduced. With this arrangement, the oil is less likely to circulate into an upper, left-side portion (in FIG. 2) of the oil pan 11 (a portion close to the right, front side of the transmission), which is close to the overflow tube 23.

The oil pan 11 that serves as a reservoir in the oil circulation network as described above and the transmission case 10 constitute oil storage means for storing oil to be supplied to and discharged from the hydraulic circuit installed on the vehicle, and the oil storage means, the above-mentioned oil pump and the strainer 13 constitute the oil suction system that draws up the oil stored in the oil storage means through the strainer 13.

In the transmission case 10 and the oil pan 11 that constitute the oil storage means, the oil storage capacity (volume) is different between at least one direction, out of the front, rear, left and right directions with respect to the center position of the suction port 13*a*, and the other direction(s). Accordingly, when the oil stored in the transmission case 10 moves toward one side of the oil pan 11 upon acceleration, deceleration or turning during running of the vehicle, or due to an inclined road surface or driving reaction force, and the liquid surface L of the oil is inclined due to the movement of the oil, the liquid level (i.e., the level of the liquid surface L) in the neighborhood of the suction port 13*a* changes depending on the direction of inclination of the liquid surface L.

Namely, in this embodiment, when the oil stored in the oil storage means moves and the liquid surface L of the oil is inclined relative to the inner bottom surface 11*a* of the oil pan 11, a difference in the oil storage capacity (the ratio of the volume) between one side and the other side of the suction port 13*a* in the oil storage means, or a total oil storage capacity on both sides of the suction port 13*a*, differs depending on the direction of inclination of the liquid surface L in the transmission case 10. If the difference in the oil storage capacity between one side and the other side of the suction port 13*a*, or the total oil storage capacity on both sides of the suction port 13*a*, becomes larger in a particular direction of inclination than those in the other directions of inclination, the level of the liquid surface L in the neighborhood of the suction port 13*a* is lowered to the lowest position when the liquid surface L is inclined in the particular direction. In this case, the oil storage capacity reaches the maximum on the raised liquid-level side of the suction port 13*a* on which the liquid level is raised. For example, where a portion of the transmission case 10 on the rear side of the suction port 13*a* has the largest internal volume, the level of the liquid surface L close to the suction port 13*a* is lowered to the minimum when the oil moves backward and the liquid surface L is inclined in the longitudinal direction (the particular direction of inclination).

In this embodiment, the suction port 13*a* is located within a, liquid-level assurance region A (a crosshatched region in FIG. 3A) in which the level of the liquid surface L close to the suction port 13*a* is higher than the level of the suction port 13*a* no matter which direction in which the liquid surface L is inclined. While the liquid-level assurance region A is close to a central portion of the oil pan 11, the center of the region A deviates from the center of the oil pan 11, according to differences among the oil storage capacities (volumes) as measured in the front, rear, left aid right directions, as shown in FIG. 2.

Figure 3A:
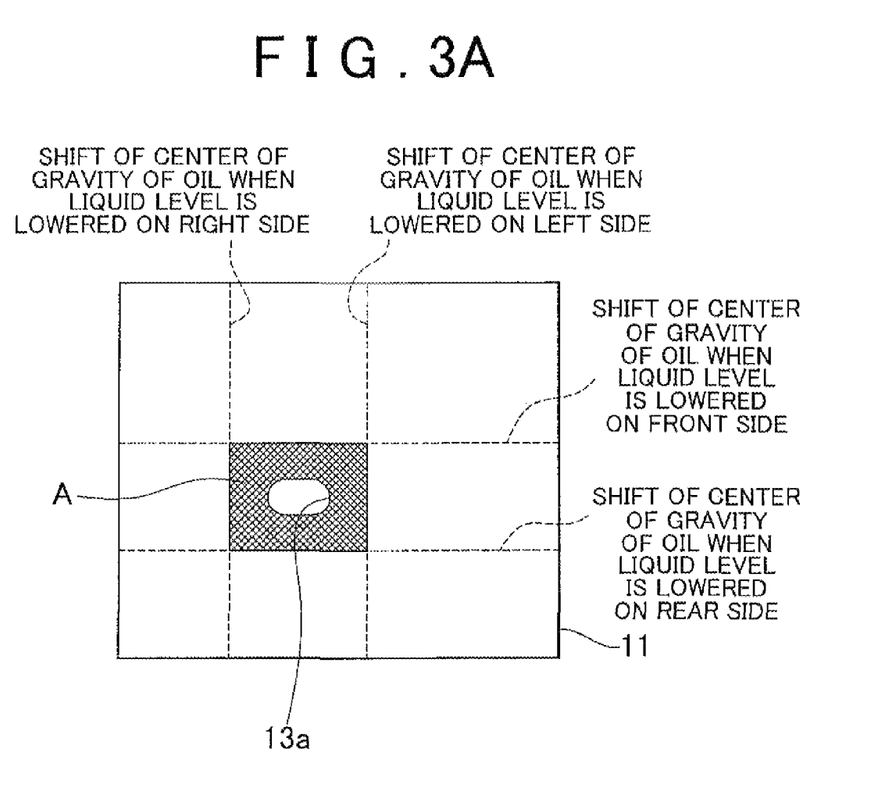
FIG. 3A is a view useful for explaining the range or region in which a suction port of the oil suction system of the first embodiment of the invention is set.

More specifically, the liquid-level assurance region A is set in the following manner: the amount of shift of the center of gravity of the oil in the transmission case 10 is specified, as shown in FIG. 3A by way of example, when the transmission case 10 is inclined by the maximum possible angle of inclination of the liquid surface which is conceivable under running conditions of the actual vehicle, in each of a plurality of directions, such as frontward, rearward, leftward and rightward, that depend on the shape of the transmission case 10, or in the particular direction in which the difference in the oil storage capacity between one side and the other side of the suction port 13*a* or the total oil storage capacity is at the maximum, and the rotational speed of the oil pump is varied from the maximum to the minimum. Then, in view of changes in, the liquid level with changes in the rotational speed of the oil pump (the maximum suction amount, the minimum suction amount), a region in which the level of the liquid surface L close to the suction port 13*a* is higher than the level of the suction port 13*a* no matter which direction in which the liquid surface L is inclined (even where the oil pump speed changes from the minimum to the maximum), for example, a region in which the gravity of center of the oil always lies, is set as the liquid-level assurance region A, and the suction port 13*a* is located in the liquid-level assurance region A.

Also, in this embodiment, inflow resistance means 30 is provided at one side of the suction port 13*a* on which the liquid level is lowered (which will be called "lowered liquid-level side") due to inclination of the liquid surface L in the particular direction (for example, one side of the suction port 13*a* facing tee front side of the transmission case 10), for increasing the resistance to flow of the oil from the lowered liquid-level side into the suction port 13*a*, to be larger than the resistance to flow of the oil from the side on which the liquid level is raised due to inclination of the liquid surface L in the particular direction (for example, one side of the suction port 13*a* facing the rear side of the transmission case 10) into the suction port 13*a*.

The inflow resistance means 30 has a shielding plate 32 disposed, for example, on the lowered liquid-level side of the suction port 13*a*. The shielding plate 32 protrudes into an oil passage 31 (see FIG. 1) between the strainer 13 and the inner bottom surface 11*a* of the oil pan 11 so as to reduce the cross-sectional area of the oil passage 31, thereby to restrict flow of the oil through the oil passage 31.

As shown in FIG. 2, the shielding plate 32 located in the vicinity of the suction port 13*a* surrounds about one half of the circumference of the suction port 13*a* on the lowered liquid-level side with respect to the center of the suction port 13*a* (see FIG. 1), and the height of the shielding plate 32 as measured in the direction of protrusion thereof into the oil passage 31 is relatively large on the side on which the liquid level is lowered when the liquid surface is inclined in the particular direction and on the side remote from the center of the suction port 13a, and is relatively small on the side close to the center of the suction port 13a.

Figure 3B:
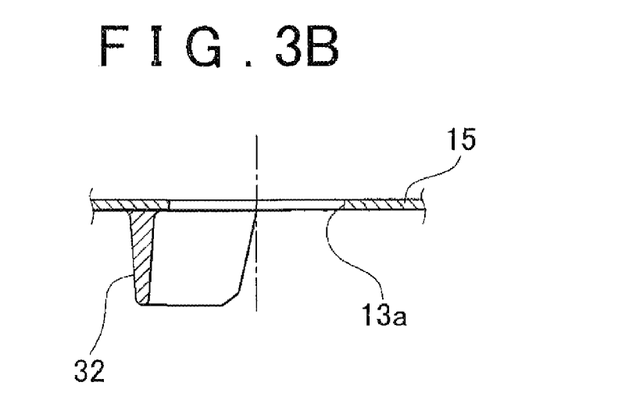
FIG. 3B is an enlarged view of a part of the oil suction system, showing the shape of the suction port and a shielding plate disposed around the suction port.

More specifically, the shielding plate 32 is formed of, for example, metal, or resin, or the like, and has a cross-sectional shape having a relatively large thickness at its proximal end and a relatively small thickness at its distal end, as shown in FIG. 3B. The shielding plate 32 is fixed integrally to the lower case 15 of the strainer 13, by caulking or other known fitting or engaging method. The shielding plate 32 may be formed integrally with the lower case 15 of the strainer 13 made of a sheet metal, or the lower case 15 may be subjected to partial bending or extruding (including drawing) during press working so as to form the shielding plate 32. The shielding plate 32 may have a constant thickness from the proximal end to the distal end.

As shown in FIG. 2, electrical wiring 17, such as a plurality of solenoid valves mounted on the valve body 12, is provided around the valve body 12. Also, a plurality of types of ribs 13v (whose internal shape is not shown) that protrude inwards with a given height are provided on the lower case 15 and upper case 16 of the strainer 13, for stabilizing flow of the oil in the strainer 13 and assuring light weight and required rigidness. Although not illustrated in the drawings, a felt for reducing the resistance to inflow of the oil is attached to the inner surface of the strainer 13.

Next, the operation of the oil suction system according to the first embodiment of the invention will be explained.

In the oil suction system of this embodiment constructed as described above, even when the liquid surface L of the oil is inclined in the particular direction in which the liquid level in the oil pan 11 is more likely to be lowered, the inflow resistance is increased on the lowered liquid-level side of the suction port 13a on which the amount of the oil is reduced, and the inflow resistance is reduced on the raised liquid-level side of the suction port 13a on which the amount of the oil is increased, whereby air is less likely or likely to be drawn into the suction port 13a.

Also, in this embodiment, the suction port is located within the liquid-level assurance region A in which the level of the liquid surface L close to the suction port 13a is higher than that of the suction port 13a no matter which direction in which the liquid surface L is inclined, and therefore, drawing of air into the oil pump can be prevented with reliability. Furthermore, the inflow resistance means 30 may be simply constructed by providing the shielding plate 32.

Also, the shielding plate 32 located in the vicinity of the suction port 13a surrounds about one half of the circumference of the suction port 13a on the lowered liquid-level side with respect to the center of the suction port 13a (see FIG. 2 and FIG. 3B), such that the height of the shielding plate 32 as measured in the direction of protrusion thereof into the oil passage 31 is relatively large on the lowered liquid-level side and on the side remote from the center of the suction port 13a, and is relatively small on the side close to the center of the suction port 13a. With this arrangement, the inflow of the oil from the lowered liquid-level side as viewed in the particular inclination direction is effectively restricted, and the liquid level is prevented from being locally lowered due to a shortage of the oil in the vicinity of the suction port 13a at low temperatures.

In this embodiment, toe particular direction of inclination of the liquid surface L is determined in view of the distribution of the oil storage capacity of the oil storage means with respect to the position of the suction port 13a as well as the oil pan 11. Therefore, even if the difference in the oil storage capacity between both sides of the suction port 13a is large and the liquid level is greatly lowered in the transmission case 10 having a narrow oil passage 31 as a spacing between the lower face of the strainer 13 and the inner bottom surface 11a of the oil pan 11, the inflow of the oil from the lowered liquid-level side of the suction port 13a upon inclination of the liquid surface L is surely restricted, and drawing of air into the oil pump is prevented with reliability. Even in an oil suction system in which the depth of the oil pan 11 is further reduced to ensure a sufficient ground clearance and the strainer 13 has a flattened shape extending in the horizontal plane, drawing of air into the oil pump is prevented with reliability.

In the oil suction system of this embodiment, when the liquid surface L of the oil is inclined in the particular direction in which the liquid level is most likely to be lowered, the inflow resistance on the lowered liquid-level side of the suction port 13a on which the liquid level is lowered is increased, while the inflow resistance on the raised liquid-level side on which the liquid level is raised is reduced. Thus, the oil suction system of this embodiment, which is simple in construction, is able to prevent drawing of air into the oil pump with reliability.

Figure 4A:
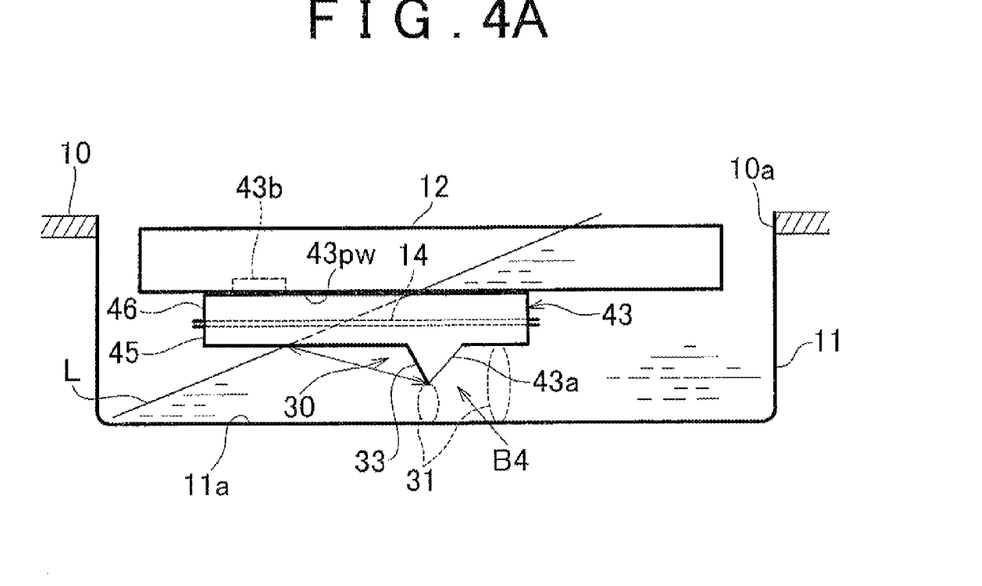
FIG. 4A is a side cross-sectional view schematically showing the construction of an oil suction system according to a second embodiment of the invention.
Figure 4B:
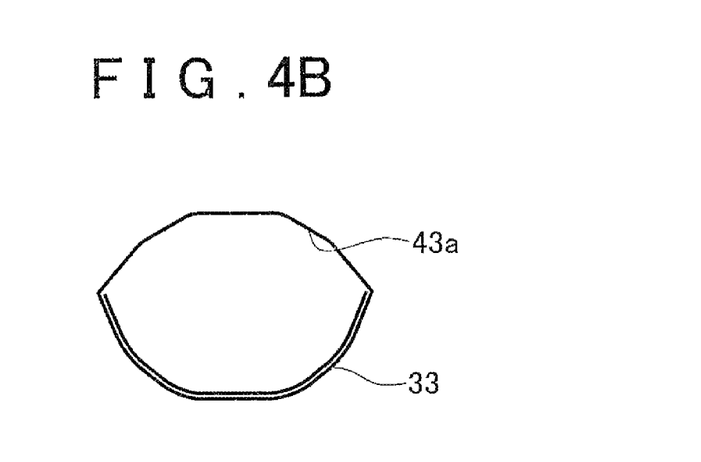
FIG. 4B is a view as seen in the direction of arrow B4 in FIG. 4A.

FIG. 4A is a side cross-sectional view schematically showing the construction of an oil suction system according to a second embodiment of the invention, and FIG. 4B is a view as seen in the direction of arrow B4 in FIG. 4A. Each of the embodiments as described below is different from the above-described first embodiment in the arrangement of the suction port of the strainer and its vicinity, but is similar in construction to the above-described embodiment with respect to the other components or parts. Thus, the same reference numerals as used in FIG. 1 through FIG. 3B are used for identifying corresponding components or elements, and only the difference(s) from the first embodiment will be described in detail.

A strainer 43 of this embodiment includes a strainer member 14 as a known filter for filtering oil, and lower case 45 and upper case 46 that are opposed to each other in the vertical direction with the strainer member 14 sandwiched therebetween. The strainer member 14 and the lower and upper cases 45, 46 cooperate to form a suction passage 43pw that communicates with the interior of the valve body 12, and a generally oval suction port 43a as shown in FIG. 4B is formed in the bottom of the lower case 45 such that the suction port 43a is open in a direction that is inclined relative to the inner bottom surface 11a of the oil pan 11. Also, a connection port 43b that is connected to an oil passage that leads to the oil pump is formed in the upper case 46, and the oil that has passed through and has been filtered by the strainer member 14 is drawn up from the connection port 43b into the oil pump.

Also, as in the first embodiment as described above, inflow resistance means 30 is provided in this embodiment at one side of the suction port 43a on which the liquid level is lowered due to inclination of the liquid surface L in a particular direction (in this embodiment, one side of the suction port 43a facing the left-hand side of the transmission case 10 as shown in FIG. 4A. The inflow resistance means 30 serves to increase the resistance to flow of the oil from the lowered liquid-level side toward the suction port 43a, to be larger than the resistance to flow of the oil from the side on which the liquid level is raised due to inclination of the liquid surface L in the particular direction (in this embodiment, one side of the suction port 43a facing the right-hand side of the transmission case 10 as shown in FIG. 4A) toward the suction port 43a.

The inflow resistance means 30 has a shielding plate 33 disposed, for example, on the lowered liquid-level side of the suction port 43*a*. The shielding plate 33 protrudes into the oil passage 31 between the strainer 43 and the inner bottom surface 11*a* of the oil pan 11 so as to reduce the cross-sectional area of the oil passage 31, thereby to restrict flow of the oil through the oil passage 31.

As shown in FIG. 4A and FIG. 4B, the shielding plate 33 located in the vicinity of the suction port 43*a* surrounds about one half of the circumference of the suction port 43*a* on the lowered liquid-level side with respect to the center of the suction port 13*a*. Also, as in the first embodiment, the height of the shielding plate 33 as measured in the direction of protrusion thereof into the oil passage 31 is relatively large on the side on which the liquid level is lowered when the liquid surface is inclined in the particular direction and on the side remote from the center of the suction port 13*a*, and is relatively small on the side close to the center of the suction port 13*a*.

For example, the shielding plate 33 is formed integrally on the strainer 43 by partial or local bending or extruding during press working of the lower case 45 made of a sheet metal. This embodiment is different from the above-described first embodiment in that the suction port 43*a* is open in the direction that is inclined relative to the inner bottom surface 11*a* of the oil pan 11. It is to be understood that the shape of the opening of the suction port 43*a* is not limited to that shown in FIG. 4B, but may be selected from other shapes.

In the second embodiment constructed as described above, too, when the liquid surface L of the oil is inclined in the particular direction in which the liquid level in the oil pan 11 is most likely to be lowered, the inflow resistance is increased on the lowered liquid-level side of the suction port 43*a* on which the amount of the oil is reduced, and the inflow resistance is reduced on the raised liquid-level side of the suction port 43*a* on which the amount of the oil is increased, so that air is less likely or unlikely to be drawn into the strainer 43 through the suction port 43*a*, and thus substantially the sane effect as that of the above-described embodiment is provided. Also, in this embodiment, the suction port 43*a* is located within the liquid-level assurance region A in which the level of the liquid surface L close to the suction port 43*a* is higher than that of the suction port 43*a* no matter which direction in which the liquid surface L is inclined, and therefore, drawing of air into the strainer 43 (or the oil pump) can be prevented with reliability.

Furthermore, the shielding plate 33 located in the vicinity of the suction port 43*a* surrounds about one half of the circumference of the suction port 43*a* on the lowered liquid-level side with respect to the center of the suction port 43*a*, such that the height of the shielding plate 33 as measured in the direction of protrusion thereof into the oil passage 31 is relatively large on the lowered liquid-level side and on the side remote from the center of the suction port 43*a*, and is relatively small on the side close to the center of the suction port 43*a*. With this arrangement, the inflow of the oil from the lowered liquid-level side as viewed in the particular inclination direction is effectively restricted, and the liquid level is prevented from being locally lowered due to a shortage of the oil in the vicinity of the suction port 43*a* at low temperatures.

In addition, the shielding plate 33 of this embodiments when viewed in a section of FIG. 4A, extends in a slanting direction with respect to the inner bottom surface of the oil pan 11. When the liquid surface L is inclined in the particular direction in which the liquid level is most likely to be lowered the thus shaped shielding plate 33 protrudes in the direction of the depth of the liquid (oil), thus assuring the required distance or spacing from the liquid surface L. Also, even when the spacing between the strainer 43 and the oil pan 11 is reduced or the strainer 43 and the oil pan 11 interfere with each other upon interference of the oil pan 11 with the road surface, for example, the shielding plate 33 keeps the required distance or spacing from the liquid surface L, and also alleviates an impact to the strainer 43.

Figure 5A:
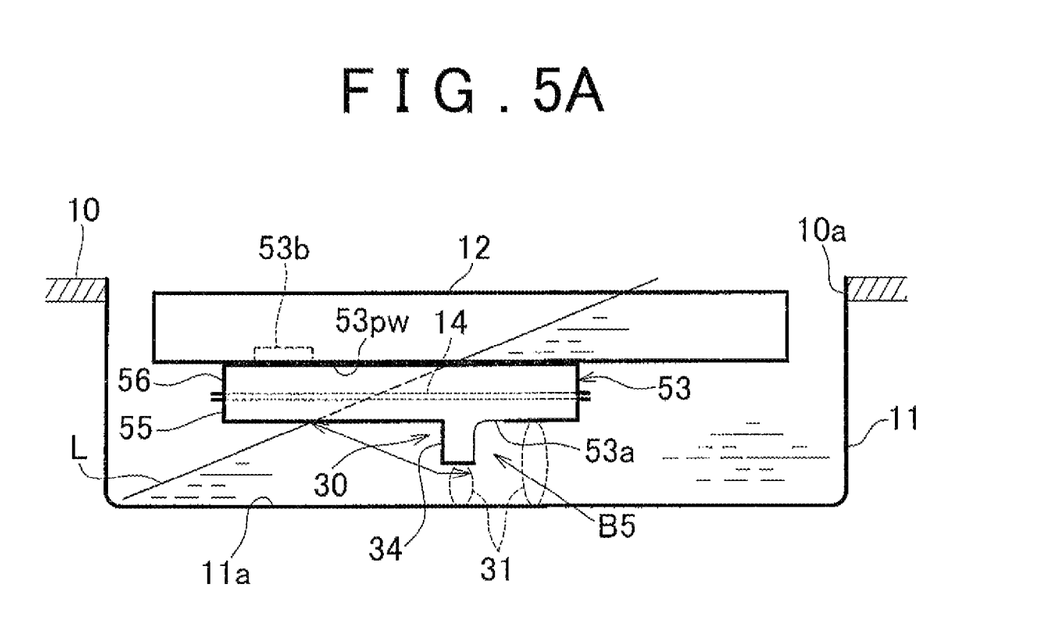
FIG. 5A is a side cross-sectional-view schematically showing the construction of an oil suction system according to a third embodiment of the invention.
Figure 5B:
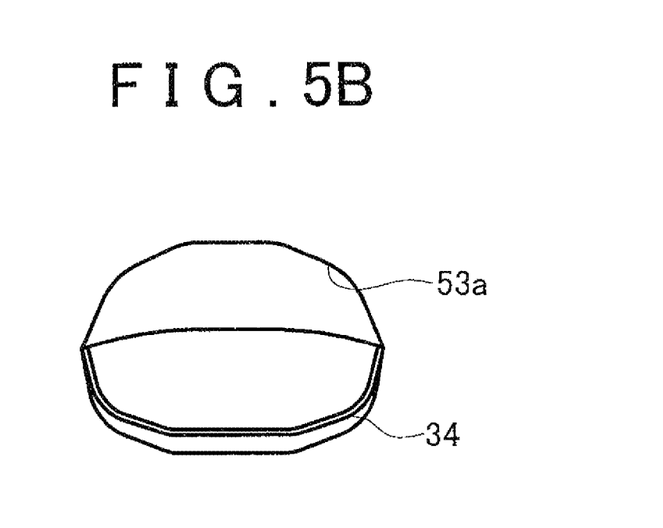
FIG. 5B is a view as seen in the direction of arrow B5 in FIG. 5A.

FIG. 5A is a side cross-sectional, view schematically showing the construction of an oil suction system according to a third embodiment of the invention, and FIG. 5B is a view as seen in the direction of arrow B5 in FIG. 5A.

As shown in FIG. 5A, a strainer 53 of this embodiment includes a strainer member 14 as a known filter for filtering oil, and lower case 55 and upper case 56 that are opposed to each other in the vertical direction with the strainer member 14 sandwiched therebetween. The strainer member 14 and the lower and upper cases 55, 56 cooperate to form a suction passage 53*pw* that communicates with the interior of the valve body 12, and a suction port 53*a* as shown in FIG. 5B is formed in the bottom of the lower case 55 such that the suction port 53*a* is open in a direction that is inclined relative to the inner bottom surface 11*a* of the oil pan 11. Also, a connection port 53*b* that is connected to an oil passage that leads to the oil pump is formed in the upper case 56, and the oil that has passed through and has been filtered by the strainer member 14 is drawn up from the connection port 53*b* into the oil pump.

In this embodiment, too, inflow resistance means 30 is provided at one side of the suction port 53*a* on which the liquid level is lowered due to inclination of the liquid surface L in a particular direction (in this embodiment, one side of the suction port 53*a* facing the left-hand side of the transmission case 10, as shown in FIG. 5A). The inflow resistance means 30 serves to increase the resistance to flow of the oil from the lowered liquid-level side toward the suction port 53*a*, to be larger than the resistance to flow of the oil from the side on which the liquid level is raised due to inclination of the liquid surface L in the particular direction (in this embodiment, one side of the suction port 53*a* facing the right-hand side of the transmission case 10, as shown in FIG. 5A) toward the suction port 53*a*.

The inflow resistance means 30 has a shielding plate 34 disposed on the lowered liquid-level side of the suction port 53*a*, as shown in FIG. 5A. The shielding plate 34 protrudes into the oil passage 31 between the strainer 53 and the inner bottom surface 11*a* of the oil pan 11 while bending at some midpoint thereof so as to reduce the cross-sectional area of the oil passage 31, thereby to restrict flow of the oil through the oil passage 31.

The shielding plate 34 located in the vicinity Of the suction port 53*a* surrounds about one half of the circumference of the suction port 53*a* on the lowered liquid-level side with respect to the center of the suction port 53*a*. Also, the height of the shielding plate 34 as measured in the direction of protrusion thereof into the oil passage 31 is relatively large on the side on which the liquid level is lowered when the liquid surface is inclined in the particular direction and on the side remote from the center of the suction port 53*a*, and is relatively small on the side close to the center of the suction port 53*a*.

For example, the shielding plate 34 is formed integrally on the strainer 53 by partial bending or extruding during press working of the lower case 55 made of, for example, a sheet metal.

In this embodiment constructed as described above, too, when the oil surface L is inclined in the particular direction in which the liquid level in the oil pan 11 is most likely to be lowered, the inflow resistance is increased on the lowered liquid-level side of the suction port 53*a* on which the amount of the oil is reduced and the inflow resistance is reduced on the raised liquid-level side of the suction port 53*a* on which the amount of the oil is increased, so that air is less likely or unlikely to be drawn into the strainer 53 through the suction port 53a, and substantially the same effect as those of the above-described embodiments is provided.

In addition, in this embodiment, the shielding plate 34 protrudes into the oil passage 31 while bending in a L-shaped cross section as shown in FIG. 5A, such that its bent portion (distal end portion) extends in parallel with the inner bottom surface of the oil pan 11 with a certain spacing therebetween. When the liquid surface L is inclined in the particular direction in which the liquid level is most likely to be lowered the distal end of the shielding plate 34 is located at a deep point (level) in the liquid, thus assuring the required distance or spacing from the liquid surface L. Also, since the shielding plate 34 thus shaped possesses high rigidity, the shielding plate 34 is kept spaced a suitable distance from the liquid surface L even if the spacing between the strainer 53 and the oil pan 11 is reduced or the strainer 53 and the oil pan 11 interfere with each other upon interference of the oil pan 11 with the road surface, for example.

Figure 6:
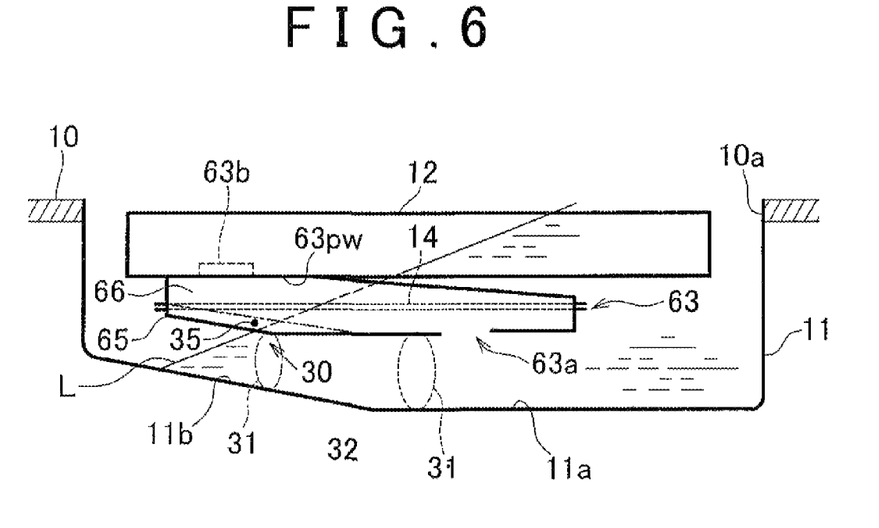
FIG. 6 is a side cross-sectional view schematically showing the construction of an oil suction system according to a fourth embodiment of the invention.

FIG. 6 is a side cross-sectional view schematically showing the construction of an oil suction system according to a fourth embodiment of the invention.

As shown in FIG. 6, a strainer 63 of this embodiment includes a strainer member 14 as a known filter for filtering oil, and lower case 65 and upper case 66 that are opposed to each other in the vertical direction with the strainer member 14 sandwiched therebetween. The strainer member 14 and the lower and upper cases 65, 66 cooperate to form a suction passage 63pw that communicates with the interior of the valve body 12, and a generally oval suction port 63a is formed in the bottom of the lower case 65 such that the suction port 63a is opposed to a generally horizontal, inner bottom surface 11a of the oil pan 11 of which a part 11b of the bottom is inclined. Also, a connection port 63b that is connected to an oil passage that leads to the oil pump is formed in the upper case 66, and the oil that has passed through and has been filtered by the strainer member 14 is drawn up from the connection port 63b into the oil pump.

In this embodiment, too, inflow resistance means 30 is provided at one side of the suction port 63a on which the liquid level is lowered due to inclination of the liquid surface L in a particular direction (in this embodiment, one side of the suction port 63a facing the left-hand side of the transmission case 10, as shown in FIG. 6). The inflow resistance means 30 serves to increase the resistance to flow of the oil from the lowered liquid-level side toward the suction port 63a, to be larger than the resistance to flow of the oil from the side on which the liquid level is raised due to inclination of the liquid surface L in the particular direction (in this embodiment, one side of the suction port 63a facing the right-hand side of the transmission case 10, as shown in FIG. 6) toward the suction port 63a.

For example, the inflow resistance means 30 consists of a part of the lower case 65 (bottom portion) of the strainer 63. More specifically; a part of the bottom of the lower case 65 is shaped to be closer to the inclined part 11b (inner surface) of the oil pan 11 than the other part of the bottom of the lower case 65, so as to reduce the cross-sectional area of the oil passage 31 between the lower case 65 and the inner bottom surface 11a of the oil pan 11 on the lowered liquid-level side of the suction port 63a as viewed in the particular inclination direction. Namely, a bulging portion 35 that bulges toward the bottom of the oil pan 11 from the two-dot chain line in FIG. 6 representing the shape of the other part of the strainer 63 is formed integrally with the strainer 63 so as to locally increase the thickness of the strainer 63.

In this embodiment constructed as described above, too, when the oil surface L is inclined in the particular direction in which the liquid level in the oil pan 11 is most likely to be lowered, the inflow resistance is increased on the lowered liquid-level side of the suction port 63a on which the amount of the oil is reduced, and the inflow resistance is reduced on the raised liquid-level side of the suction port 63a on which the amount of the oil is increased, so that air is less likely or unlikely to be drawn into the strainer 63 through the suction port 63a, and substantially the same effect as those of the above-described embodiments is provided.

In addition, in this embodiment, even in the case where the oil pan has a very shallow depth, or where the inner bottom surface of the oil pan is inclined, the effective inflow resistance means can be easily constructed without installing another component, thus making the system simple in construction. Also, the storage capacity in the oil strainer 63 is increased, and the area of the felt mounted on the inner surface of the oil strainer 63 is increased, so that the inflow resistance of the suction passage 63pw in the strainer 63 can be reduced, and cavitation during drawing of the oil can be prevented with reliability.

Figure 7:
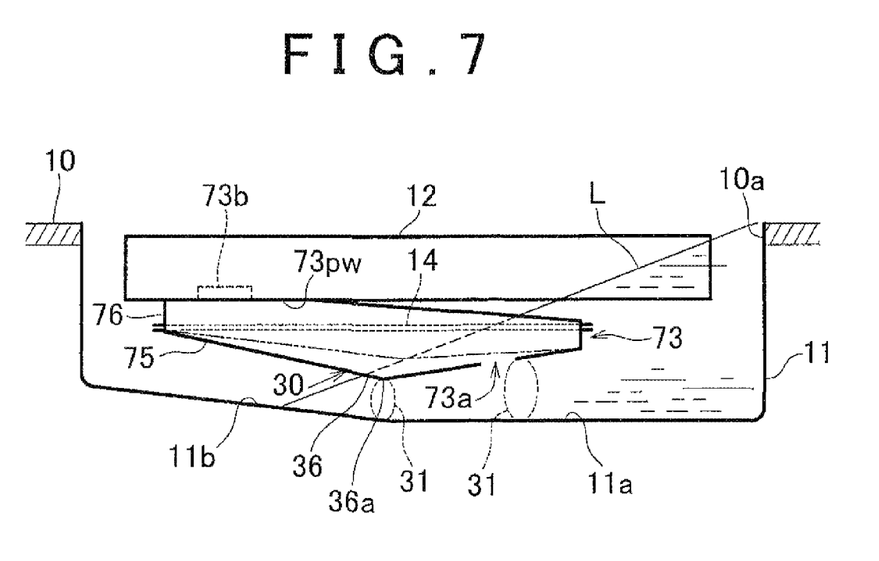
FIG. 7 is a side cross-sectional view schematically showing the construction of an oil suction system according to a fifth embodiment of the invention.

FIG. 7 is a side cross-sectional view schematically showing the construction of an oil suction system according to a fifth embodiment of the invention.

As shown in FIG. 7, a strainer 73 of this embodiment includes a strainer member 14 as a known filter for filtering oil, and lower case 75 and upper case 76 that are opposed to each other in the vertical direction with the strainer member 14 sandwiched therebetween. The strainer member 14 and the lower and upper cases 75, 76 cooperate to form a suction passage 73pw that communicates with the interior of the valve body 12, and a generally oval suction port 73a is formed in the bottom of the lower case 75, such that the suction poll 73a is opposed to a generally horizontal, inner bottom surface 11a of the oil pan 11 of which a part 11b of the bottom is inclined. Also a connection port 73b that is connected to an oil passage that leads to the oil pump is formed in the upper case 76, and the oil that has passed through and has been filtered by the strainer member 14 is drawn up from the connection port 73b into the oil pump.

In this embodiment, too, in flow resistance means 30 is provided at one side of the suction poll 73a on which the liquid level is lowered due to inclination of the oil surface L in a particular direction (in this embodiment, one side of the suction port 73a facing the left-hand side of the transmission case 10, as shown in FIG. 7). The inflow resistance means 30 serves to increase the resistance to flow of the oil from the lowered liquid-level side toward the suction port 73a, to be larger than the resistance to flow of the oil from the side on which the liquid level is raised due to inclination of the liquid surface L in the particular direction (in this embodiment, one side of the suction port 73a facing the right-hand side of the transmission case 10, as shown in FIG. 7) toward the suction port 73a.

For example, the inflow resistance means 30 consists of a part of the lower case 75 (bottom portion) of the strainer 73. More specifically, a longitudinally middle portion of the bottom of the lower case 75 is shaped to be closer to the inner bottom surface 11a of the oil pan 11 than the other portion of the bottom of the lower case 75, so as to reduce the cross-sectional area of the oil passage 31 between the lower case 75 and the inner bottom surface 11a of the oil pan 11 on the lowered liquid-level side of the suction port 73a as viewed in the particular inclination direction. Namely; a bulging portion 36 that bulges toward the bottom of the oil pan 11 from the two-dot chain line in FIG. 7 representing the shape of the other portion is formed integrally with the strainer 73 so as to locally increase the thickness of the strainer 73. In this case, the cross-sectional area of the oil passage 31 between the strainer 73 and the inner bottom surface 11a of the oil pan 11 gradually decreases from the left end in FIG. 7 toward the suction portion 73a until the oil passage 31 reaches the lowest point 36a of the bulging portion 36, and increases in the vicinity of the suction port 73 (i.e., from the lowest point 36a to the suction port 73).

In this embodiment constructed as described above, too, when the oil surface L is inclined in the particular direction in which the liquid level in the oil pan 11 is most likely to be lowered, the inflow resistance is increased on the lowered liquid-level side of the suction port 73a on which the amount of the oil is reduced and the inflow resistance is reduced on the raised liquid-level side of the suction port 73a on which the amount of the oil is increased, so that air is less likely or unlikely to be drawn into the strainer 73 through the suction port 73a, and substantially the same effect as those of the above-described embodiments, in particular that of the fourth embodiment, is provided.

Figure 8:
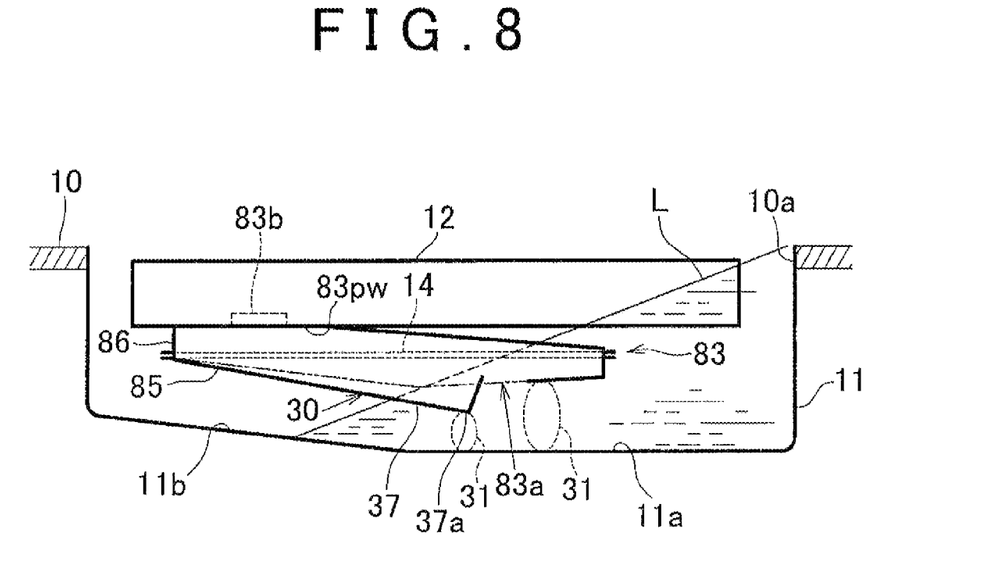
FIG. 8 is a side cross-sectional view schematically showing the construction of an oil suction system according to a sixth embodiment of the invention.

FIG. 8 is a side cross-sectional view schematically showing, the construction of an oil suction system according to a sixth embodiment of the invention.

As shown in FIG. 8, a strainer 83 of this embodiment includes a strainer member 14 as a known filter for filtering oil, and lower case 85 and upper case 86 that are opposed to each other in the vertical direction with the strainer member 14 sandwiched therebetween. The strainer member 14 and the lower and upper cases 85, 86 cooperate to form a suction passage 83pw that communicates with the interior of the valve body 12, and a generally oval suction port 83a is formed in the bottom of the lower case 85 such that the suction port 83a is opposed to a generally horizontal, inner bottom surface 11a of the oil pan 11 of which a part 11b of the bottom is inclined. Also, a connection port 83b that is connected to an oil passage leading to the oil pump is formed in the upper case 86, and the oil that has passed through and has been filtered by the strainer member 14 is drawn up from the connection port 83b into the oil pump.

In this embodiment, too, inflow resistance means 30 is provided at one side of the suction port 83a on which the liquid level is lowered due to inclination of the liquid surface L in a particular direction (in this embodiment, one side of the suction port 83a facing the left-hand side of the transmission case 10, as shown in FIG. 8). The inflow resistance means 30 serves to increase the resistance to flow of the oil from the lowered liquid-level side toward the suction port 83a, to be larger than the resistance to flow of the oil from the side on which the liquid level is raised due to inclination of the liquid surface L in the particular direction (in this embodiment, one side of the suction port 83a facing the right-hand side of the transmission ease 10, as shown in FIG. 8) toward the suction port 83a.

For example, the inflow resistance means 30 consists of a part of the lower case 85 (bottom portion) of the strainer 83. More specifically, a portion of the bottom of the lower case 85 which extends from the left end in FIG. 8 to the vicinity of the suction portion 83a is shaped to be closer to the inner bottom surface 11a of the oil pan 11 than the other portion (closer to the right end in FIG. 8) of the bottom of the lower case 85, so as to reduce the cross-sectional area of the oil passage 31 between the lower case 85 and the inner bottom surface 11a of the oil pan 11 on the lowered liquid-level side of the suction port 83a as viewed in the particular inclination direction. Namely, a bulging portion 37 that bulges toward the bottom of the oil pan 11 from the two-dot chain line in FIG. 8 representing the shape of the other portion is formed integrally with the strainer 83 so as to locally increase the thickness of the strainer 83. In this case, the cross-sectional area of the oil passage 31 between the strainer 83 and the inner bottom surface 11a of the oil pan 11 gradually decreases from the left end in FIG. 8 toward the suction portion 83a until the oil passage 31 reaches the lowest point 37a of the bulging portion 37, and suddenly increases in the vicinity of the suction port 83. It is also to be noted that the cross-sectional area of the oil passage 31 in the vicinity of the lowest point 37a of the bulging portion 37 is largely different from that of the oil passage 31 right below the suction port 83a.

In this embodiment constructed as described above, too, when the oil surface L is inclined in the particular direction in which the liquid level in the oil pan 11 is most likely to be lowered, the inflow resistance is increased on the lowered liquid-level side of the suction port 83a on which the amount of the oil is reduced, and the inflow resistance is reduced on the raised liquid-level side of the suction port 83a on which the amount of the oil is increased, so that air is less likely or unlikely to be drawn into the strainer 83 through the suction port 83a, and substantially the same effect as those of the above-described embodiments is provided.

While the shielding plate is disposed on one side of the suction port corresponding to any one of the front, rear, left and right sides of the transmission case in each of the first through third embodiments the above-mentioned particular direction of inclination may be a slanting direction that is inclined a certain angle relative to the longitudinal direction of the vehicle, depending on the shape of the transmission case 1I and the orientation of the case 10 when installed on the vehicle. Also, the shielding plate may have a curved cross-section, or an arc-shaped bulging portion may be formed to surround the lowered liquid-level side of the suction port as viewed in the particular inclination direction.

As explained above, in the oil suction system according to the present invention, when the oil surface is inclined in the particular direction in which the liquid level is most likely to be lowered, the inflow resistance is increased on the lowered liquid-level side of the suction port on which the liquid level is lowered, while the inflow resistance is reduced on the raised liquid-level side on which the liquid level is raised. Thus, the oil suction system, which is simple in construction, is able to prevent drawing of air into the oil pump with reliability. The present invention is useful for oil suction systems in general, in particular, oil suction systems provided in lower parts of automatic transmissions of vehicles.

What is claimed is:

1. An oil suction system, comprising:
an oil reservoir in which oil to be supplied to and discharged from a hydraulic circuit installed on a vehicle is stored in at least an oil pan; and
a strainer having a suction port that faces to an inner bottom surface of the oil pan, an oil suction system drawing up the oil stored in the oil reservoir through the strainer, wherein:
the suction port is generally oval in shape, the oval having a longest diameter and a shortest diameter,
the oil reservoir is constructed such that, when a liquid surface of the oil is inclined due to movement of the oil stored in the oil reservoir, a level of the liquid surface close to the suction port varies in accordance with a plurality of directions of inclination of the liquid surface, and the level of the liquid surface close to the suction port is lower in a particular direction as one of said plurality of directions of inclination of the liquid surface, than those in the other directions of inclination, an inflow resistance portion is provided at a lowered liquid-level side of the suction port on which the level of the liquid surface is lowered when the liquid surface is inclined in said particular direction, for adjusting resistance to flow of the oil when the oil is drawn up through the strainer, in such a manner that the resistance to flow of the oil from the lowered liquid-level side toward the suction port, is larger than the resistance to flow of the oil from a raised liquid-level side of the suction port on which the level of the liquid surface is raised due to inclination of the liquid surface in the particular direction, toward the suction port, when the oil stored in the oil reservoir moves, and the liquid surface of the oil is inclined relative to the inner bottom surface of the oil pan, a difference in an oil storage capacity between one side and the other side of the suction port in the oil reservoir varies in accordance with said plurality of directions of inclination of the liquid surface, the difference in the oil storage capacity between the one side and the other side of the suction port is larger in said particular direction than those in the other directions of inclination, and the oil storage capacity is at the maximum on the raised liquid-level side of the suction port when the liquid surface of the oil is inclined in the particular direction, wherein the inflow resistance portion comprises a shielding plate that is provided at the lowered liquid-level side of the suction port and protrudes into an oil passage between the strainer and the inner bottom surface of the oil pan so as to reduce a cross-sectional area of the oil passage, and wherein:

the shielding plate is constructed such that a height of the shielding plate, as measured in a direction of protrusion thereof into the oil passage, is larger on the lowered liquid-level side and on a side farther from a center of the suction port, as measured along the shortest diameter, and the height tapers to a smaller height on a side closer to the center of the suction port, as measured along the shortest diameter; and the shielding plate located in the vicinity of the suction port surrounds only about one half of the circumference of the suction port on the lowered liquid-level side with respect to the center of the suction port.

2. The oil suction system according to claim 1, wherein the suction port is located within a liquid-level assurance region in which the level of the liquid surface close to the suction port is higher than a level of the suction port no matter which direction in which the liquid surface is inclined.

3. The oil suction system according to claim 2, wherein a center of the liquid-level assurance region is positioned according to a range of a difference between a first inclination of the liquid surface when a first amount of the oil is drawn up through the strainer and a second inclination of the liquid surface when a second amount of the oil is drawn up through the strainer.

4. The oil suction system according to claim 3, wherein the liquid-level assurance region is a region in which the center of gravity of the oil always lies.

5. The oil suction system according to claim 1, wherein:

the inflow resistance portion comprises a part of a bottom of the strainer; and said part of the bottom of the strainer is located closer to the inner bottom surface of the oil pan than the other part of the bottom so as to reduce a cross-sectional area of an oil passage between the strainer and the inner bottom surface of the oil pan at the lowered liquid-level side of the suction port.

6. The oil suction system according to claim 1, wherein:

the hydraulic circuit is provided in a power transmitting system of the vehicle, and a valve body in which a plurality of valves as part of the hydraulic circuit are housed is disposed above the strainer; and an oil suction passage in the strainer communicates with an interior of the valve body.

7. The oil suction system according to claim 6, wherein the power transmitting system comprises an automatic transmission.

* * * * *